United States Patent [19]
Güntner

[11] 3,937,431
[45] Feb. 10, 1976

[54] POSTIONING APPARATUS FOR TRACKED TRANSPORT VEHICLES WITH LINEAR MOTOR PROPULSION

[75] Inventor: Herwig Güntner, Schwabach, Germany

[73] Assignee: Siemens Aktiengesellshaft, Munich, Germany

[22] Filed: Sept. 12, 1974

[21] Appl. No.: 505,258

[30] Foreign Application Priority Data
Sept. 14, 1973 Germany............................ 2346421

[52] U.S. Cl. ...................... 246/182 B; 104/148 LM
[51] Int. Cl.² .......................................... B61L 3/00
[58] Field of Search. 104/148 LM, 148 MS, 148 SS; 246/182 B, 187 B, 201, 202; 310/12, 13; 318/135

[56] References Cited
UNITED STATES PATENTS

| | | | |
|---|---|---|---|
| 3,334,224 | 8/1967 | Allen | 246/182 B |
| 3,363,096 | 1/1968 | Hughson et al. | 246/182 B |
| 3,493,741 | 2/1970 | Lubich | 246/182 B |
| 3,519,805 | 7/1970 | Thorne-Booth | 246/182 B |
| 3,850,105 | 11/1974 | Aronstein et al | 246/182 B |

FOREIGN PATENTS OR APPLICATIONS
721,434   11/1965   Canada ........................ 246/182 B

*Primary Examiner*—M. Henson Wood, Jr.
*Assistant Examiner*—Reinhard J. Eisenzopf
*Attorney, Agent, or Firm*—Kenyon & Kenyon Reilly Carr & Chapin

[57] ABSTRACT

This invention concerns a positioning device for a transport vehicle, constrained to travel along a track. These transport vehicles are propelled by linear motor propulsion. Along the track are positioning points typically located at stations for entering and exiting the vehicle. Associated with the means for linear motor propulsion, stationary in the track at the positioning points are two switches, means to detect the velocity of the vehicle and a logic control circuit, so that acceleration, deceleration and zero strength excitation signals can be applied to the linear motor in the vehicle so as to cause the vehicle to come to rest at the positioning point. The apparatus controls a vehicle travelling in either direction along the track.

7 Claims, 7 Drawing Figures

POSITIONING APPARATUS FOR TRACKED TRANSPORT VEHICLES WITH LINEAR MOTOR PROPULSION

BACKGROUND OF THE INVENTION

1. Field of the Invention:

The invention relates to a positioning device for transport vehicles constrained to travel along a track and which are propelled by a linear motor drive.

2. Description of the Prior Art:

Prior art positioning devices for these vehicles are shown in the journal Elektrie, vol. 24, No. 10, 1970, pp. 358–361. Shown therein are asynchronous linear motors, used to propel track - constrained vehicles in both directions. The inducing primary parts of the linear motors are stationarily placed along the track for the pulse-wise acceleration and positioning of the vehicles. On each vehicle, there is mounted a secondary part in the form of laminated ferromagnetic material on which are placed bars of high electric conductivity spaced as the pole pitch spacing of the stationary primary part. Provided at positioning points where a vehicle is to be brought to a stop with specified accuracy are four switching means which sense different vehicle positions relative to the positioning point. These switching means are operated successively as a function of travel direction and are coupled with a logic circuit in such a manner that upon the vehicle's arrival in the positioning area an actuation of the first two switching means direction information is stored and a travelling field excitation opposing the vehicle direction and travel is sent to the vehicle windings. Upon the additional actuation of the third switch another pulse of travelling field excitation is sent lasting a fraction of the duration of the reverse excitation in order to safely avoid a reversal of the travel direction of the vehicle before it reaches the positioning point. However, the kinetic energy of the vehicle entering the positioning area at the slowest travel velocities must be sufficient to actuate a fourth switching means which actuates a DC field in the primary part which under ideal conditions brings the vehicle to the positioning point without oscillation.

Because in practice the various vehicles will reach the positioning areas at differing speeds because of different cargoes i.e., masses, and different line conditions, an approach without oscillation is not likely because of the above-mentioned pulsed reversed current braking action. The transport vehicles often will overshoot the positioning point with greater or lesser residual velocity and release the first switching means so instead of a DC field braking action a new opposing travelling field excitation occurs. When this happens, the travel direction of the vehicle reverses and all four switching means are again actuated leading to another DC field excitation. If the travel vehicle overshoots the positioning point in the opposite direction again releasing the fourth switching means, a travelling field excitation in the original travel direction takes place. This alternating of travelling field excitation and DC field excitation continues until the oscillating motion of the vehicle comes to rest at the positioning point. The number, magnitude and duration of these oscillations greatly depends on the vehicle mass and the friction of the vehicle on the track.

It is an object of this invention to achieve, while saving switching means, a reduction of the number of field excitation changes and vehicle oscillations even though the masses of the vehicles and the frictional forces may differ greatly.

SUMMARY OF THE INVENTION

According to the invention this object is achieved by the provision of two switching means and a vehicle measuring device associated with a stationary linear motor part in the positioning area and connected to an exicter selection circuit so that during actuation of one of the two switching means an accelerating, decelerating or zero travelling field excitation is applied depending on the travel speed, and at a DC field excitation is applied independent of the vehicle speed if both switching means are actuated simultaneously. The magnitude and/or the duration of the travelling field excitation is dependent on the measured vehicle speed.

DESCRIPTION OF THE INVENTION

Linear motors can be constructed in a variety of ways. They may be asynchronous or synchronous. Primary windings may be stationary in the track or they may be placed on the vehicle itself. The primary windings may be on one or both sides of the induced secondary windings. Secondary windings, if on the vehicle, should be in the form of inductor laminations in parallel rows. If the secondary windings are stationary along the track they should be in the form of a continuous rail of ferromagnetic material but having rows of conducting material perpendicular to the track in the positioning area.

Figure 1:
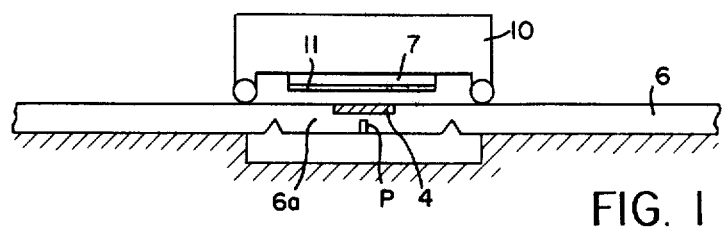
FIG. 1 shows a tracked vehicle propelled by a linear induction motor at a positioning point.

The preferred embodiment of the positioning system will be described wherein the primary windings are placed on the vehicle while the stationary part of the motor is a ferromagnetic rail or bar laid continuously in the track. FIG. 1 shows a transport vehicle 10 which has attached thereto an inducing primary part 7 and travels over the secondary part 6 while maintaining an air gap between the primary part 7 and the secondary part 6. Secondary part 6 is laid continuously along the transport path. On either side of a positioning point P the secondary part 6 has an area 4 of conducting material of a width proportional to the pole width of the primary windings. In order to achieve stabilization of the transport vehicle with respect to the positioning point P, separate DC field winding of the primary part are excited. The area 4 is placed in a part 6a, which is designed in the form of a movable mounted friction member. The movable part 6a may be moved vertically by the increased magnetic attraction of DC excited windings in primary part 7 thereby making contact with a brake lining 11 on the underside of primary part 7 so as to achieve an additional mechanical braking effect.

Figure 2:
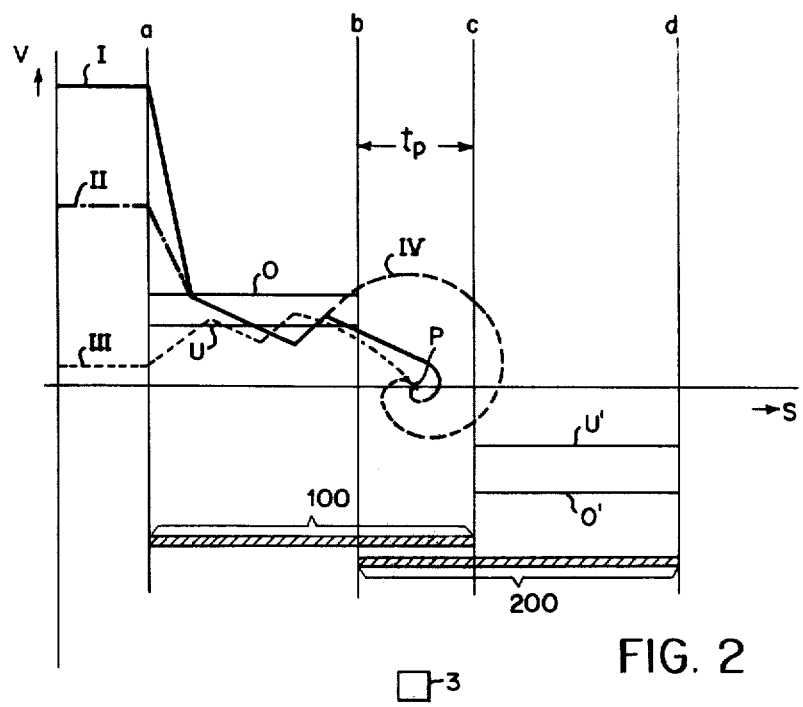
FIG. 2 shows a speed-distance diagram for three different initial speeds as a vehicle approaches a position point P from left to right.

FIG. 2 shows a velocity-distance diagram for a positioning system in which there are placed on both sides of and spaced some distance away from the positioning point P position sensors 100 and 200 respectively, for sensing the presence of the vehicle within a position area. A velocity-measuring device 3 is provided which measures the vehicle velocity when a transport vehicle is in the positioning area between $a$ and $d$ which is equivalent to the area 4 shown in FIG. 1. Although the diagram in FIG. 2 is constructed showing vehicles travelling from left to right, it should be realized that the positioning system works in an equivalent manner for vehicles travelling from right to left.

Figure 3:
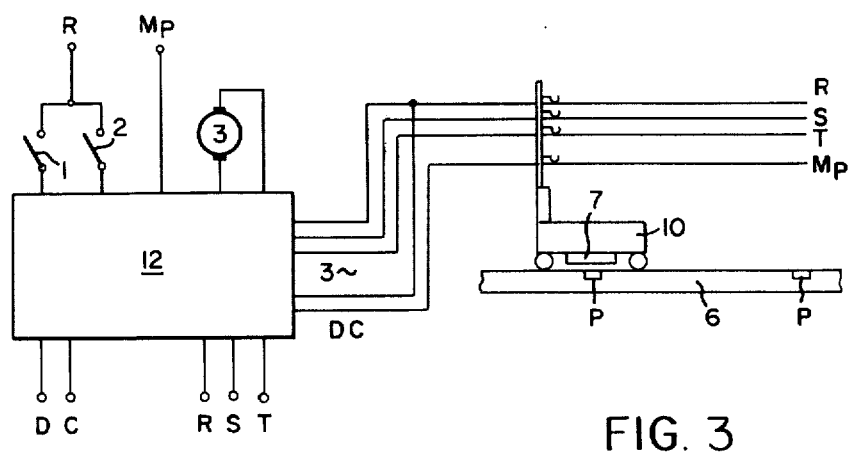
FIG. 3 shows means for applying accelerating and decelerating AC and DC fields to a vehicle depending on the position of switches which are closed or open depending on the position of the vehicle and the velocity of the vehicle.

FIG. 3 shows switches 1 and 2, which are controlled by positioning sensors 100 and 200 (not shown) and the velocity-measuring device 3 connected to an excited selection circuit 12 which controls the travelling field excitation and/or the DC field excitation of the primary part 7 of the vehicle in the positioning areas of secondary part 6 having associated therewith the individual positioning point P.

If a transport vehicle 10 as shown in FIG. 1 reaches the left boundary $a$ (FIG. 2) of the positioning area at a maximum speed $v_I$ thereby actuating position sensor 100 which controls switch 1 and causing the velocity-measuring device 3 to measure the vehicle velocity, the polarity of the travelling field excitation of the primary part 7 is reversed by the exciter selection circuit 12 and a reverse current strength depending on the vehicle velocity is applied to the primary field windings until vehicle velocity is decreased to the value $v_0$ within the section $a/b$. Then the excitation of the primary part is changed so that the vehicle velocity decreases to a lower value $v_t$. If the velocity falls below $v_t$ and accelerating primary field excitation is applied until the speed $v_t$ is achieved. The briefly accelerated vehicle 10 reaches the section $b/c$ at a speed slightly above $v_t$ where both positioning sensors 100 and 200 are actuated by the vehicle which closes both switches 1 and 2 thereby causing the exciter selection circuit to apply a DC field excitation of the primary part which stops the transport vehicle 10 at the positioning point P with very slight oscillation.

If the vehicle 10 enters the section $a/b$ at a lower travel speed $v_{II}$ the reverse current acceleration is reduced accordingly until the speed reaches $v_0$. The vehicle then reaches positioning point P in the same way as was discussed above.

A low velocity case is shown for a vehicle speed $v_{III}$ which is lower than $v_t$ and which results in the exciter selection circuit 12 applied a correspondingly strong acceleration travelling field excitation to the primary windings upon the closing of switch 1 until the speed $v_t$ is reached, whereupon the excitation of the primary part is terminated. This process may repeat if the travel speed falls below $v_t$. The vehicle reaches point P under DC field excitation to the primary part.

If the travel speed $v_0$ increases due to extraneous effects, the vehicle may go past section $b/c$ and switch 1 will be opened. This causes a travelling field excitation opposite to the direction in which the vehicle was originally travelling to be temporarily applied until both switches 1 and 2 are again actuated and the vehicle is stopped at positioning point P by excitation of the DC field.

Figure 4:
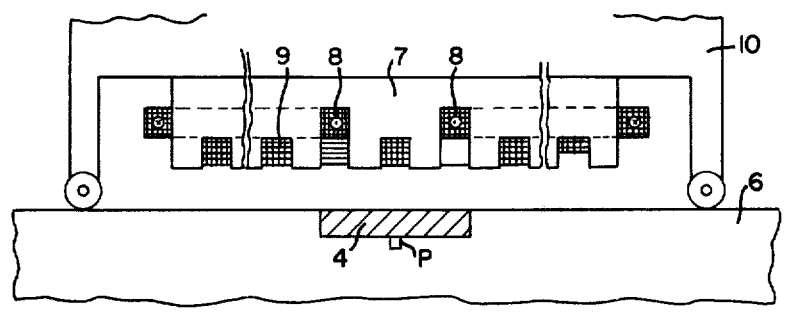
FIG. 4 shows separate DC windings in conjunction with travelling field windings of a primary part of a linear induction motor attached to a vehicle.
Figure 5:
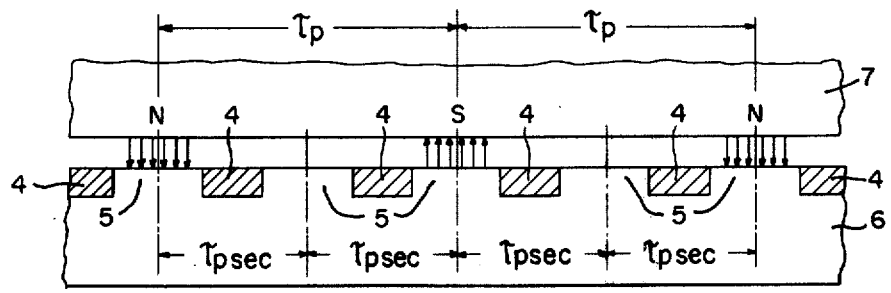
FIG. 5 shows an arrangement of conducting bars implanted in the stationary part of a linear induction motor.

The number and magnitude of the position oscillations can be minimized or even eliminated entirely by properly designing the width of section $a/b$ and $c/d$ and the magnitude of the acceleration or deceleration travelling field excitation as a function of the travel speed for section $b/c$. A reduction in the field strength required of the DC windings can be achieved by either providing a separate DC winding 8 shown in FIG. 4 with a larger pole pitch than that of the travelling field winding 9 of the primary part 7 or by making the pole pitch $\tau_\mu$ length, which is equivalent to the space $b/c$ of FIG. 2, of the travelling field winding of the primary part 7 an integral multiple of the pole pitch $\tau_{\mu sec}$ of the secondary part 6 according to FIG. 5.

Figure 6:
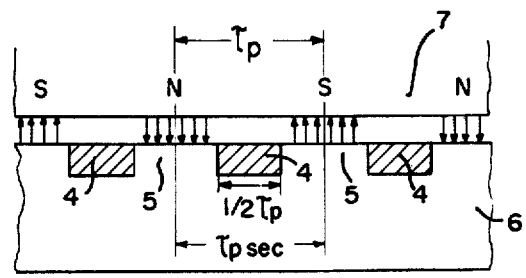
FIG. 6 shows an optimum width of conductor bars placed in a stationary part of a linear inductor motor.

A stronger braking force can be obtained by making the width of copper-filled gaps 4 (FIG. 6) between the pole teeth 5 of the secondary part 6 larger than one-half of the pole pitch $\tau_p$ of the primary part 7.

With the arrangement of the primary part in the vehicle as described, the vehicle is driven continuously between the various positioning points P avoiding unduly great differences in entering speeds into the individual positioning areas. Differing entering speeds as described in FIG. 2 are unavoidable due to the differing line sections and cargoes carried.

Figure 7:
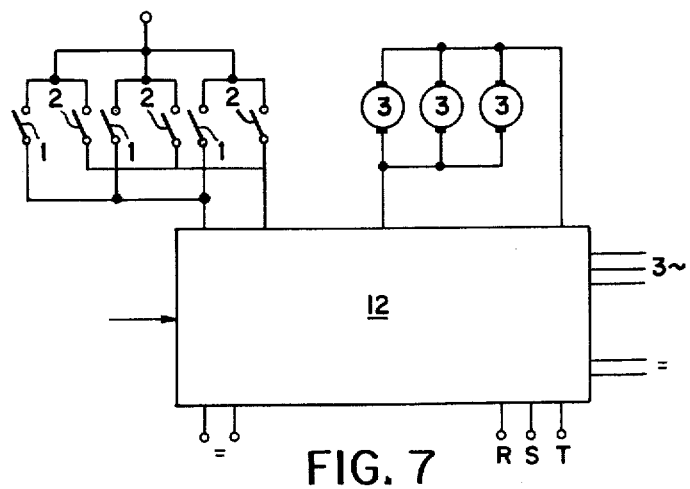
FIG. 7 shows parallel connection of measuring devices and switches at several positioning points to a common excitation logic circuit.

Switches 1 and 2 and the velocity-measuring device 3 at the several positioning points P of FIG. 3 may be connected in parallel and applied to a common exciter control circuit 12 as shown in FIG. 7. The switching means may be mechanically actuated switches or of transistor design. A tachometer may be provided as the velocity-measuring device. Speed may also be measured inductively by a photocell or a Hall probe.

What is claimed is:

1. Positioning apparatus for tracked transport vehicles having a primary alternating current linear motor windings and separate direct current windings located in the vehicle and stationary linear motor parts of a ferromagnetic bar within the position area having a position point therein, said bar having rows of conducting material placed in an orientation perpendicular to the track and spaced a distance from one another as the pole pitch spacing of the primary winding, comprising:

means for sensing the position of the vehicle as it approaches the positioning point from either direction on the track within the position area;

switching control means responsive to said position means for closing one or two switches depending on the position of the vehicle within the position area;

means for measuring the vehicle velocity while said vehicle is within said position area;

excitation control circuit means responsive to said velocity measurement and said switch positions for applying an accelerating, decelerating or zero strength excitation to said primary alternating current linear motor windings if either one or the other of said two switches are closed and for applying a direct current field excitation to said separate direct current windings regardless of said velocity measurement if both of said switches are closed simultaneously.

2. The apparatus of claim 1 wherein the direct current windings on said vehicle have a greater pole pitch than that of the alternating current linear motor windings.

3. The apparatus of claim 1 wherein the ratio of the pole pitch of the primary windings to the spacing between conductors in said ferromagnetic secondary part is an integral ratio.

4. The apparatus of claim 1 wherein the width of the conductor material in said ferromagnetic secondary part is greater than half the pole pitch of the primary alternating current linear motor windings.

5. The positioning apparatus of claim 1 wherein the secondary part is vertically movable and the underside of said primary part of said vehicle has attached thereto a brake lining.

6. A vehicle propulsion and positioning system for tracked vehicles having a propulsion system with primary alternating current linear motor windings and separate direct current windings in said vehicles and a secondary part having a continuous homogeneous ferromagnetic bar along the entire length of the track except for multiple position areas along the track wherein the said stationary part is a ferromagnetic bar having a position point therein said bar, having rows of conducting material placed in an orientation perpendicular to the track and spaced a distance from one another as the pole pitch spacing of the alternating current primary winding comprising at each position area:

- means for sensing the position of the vehicle as it approaches the positioning point from either direction on the track within the position area;
- switching control means responsive to said position means for closing one or two switches depending on the position of the vehicle within the position area;
- means for measuring the vehicle velocity while said vehicle is within said position area;
- excitation control circuit means responsive to said velocity measurement and said switch positions for applying an accelerating, decelerating or zero strength excitation to said primary alternating current linear motor windings if either one or the other of said two switches are closed and for applying a direct current field excitation to said separate direct current windings regardless of said velocity measurement if both of said switches are closed simultaneously.

7. The propulsion and positioning of claim 6 wherein the switching control means in the velocity measuring means for each of said multiple positioning areas are connected in parallel to a single excitation control circuit means.

* * * * *

UNITED STATES PATENT AND TRADEMARK OFFICE
CERTIFICATE OF CORRECTION

PATENT NO. : 3 937 431
DATED : February 10, 1976
INVENTOR(S) : Herwig Güntner

It is certified that error appears in the above-identified patent and that said Letters Patent are hereby corrected as shown below:

In Claim 6, column 5, line 17, insert "transport" between "tracked" and "vehicles."

In Claim 6, column 5, line 23, insert "linear" between "stationary" and "part."

In Claim 7, column, 6, line 22, insert "system" between "positioning" and "of."

Signed and Sealed this twenty-ninth Day of June 1976

[SEAL]

Attest:

RUTH C. MASON
Attesting Officer

C. MARSHALL DANN
Commissioner of Patents and Trademarks